United States Patent [19]
Kiellarson et al.

[11] 3,972,153
[45] Aug. 3, 1976

[54] PROCESS FOR PACKAGING GOODS IN A STEAM ATMOSPHERE

[75] Inventors: Folke Kiellarson, Barseback; Sven Roos; Thomas Quist, both of Bjarred, all of Sweden

[73] Assignee: AB Akerlund & Rausing, Lund, Sweden

[22] Filed: Apr. 21, 1975

[21] Appl. No.: 569,612

[30] Foreign Application Priority Data
Apr. 29, 1974 Sweden............................ 7405699

[52] U.S. Cl................................. 53/22 A; 53/11; 53/30 R; 53/112 A; 53/184 R; 425/387 R
[51] Int. Cl.²........................................ B65B 31/02
[58] Field of Search........... 53/11, 22 A, 30, 112 A, 53/184; 425/387

[56] References Cited
UNITED STATES PATENTS

| | | | |
|---|---|---|---|
| 1,737,874 | 12/1929 | Busch | 425/387 X |
| 2,736,150 | 2/1956 | Loew | 53/30 X |
| 2,759,307 | 8/1956 | Eoklin | 53/11 |
| 3,530,641 | 9/1970 | Bergstrom | 53/184 X |
| 3,884,012 | 5/1975 | Ernstsson et al | 53/22 A |

*Primary Examiner*—Travis S. McGehee
*Attorney, Agent, or Firm*—Pierce, Scheffler & Parker

[57] ABSTRACT

The invention concerns packaging a food product in an atmosphere of steam into a container one part of which is cupped, the cupping of the package being effected by means of steam. The invention also relates to an apparatus for carrying out the packaging method.

12 Claims, 4 Drawing Figures

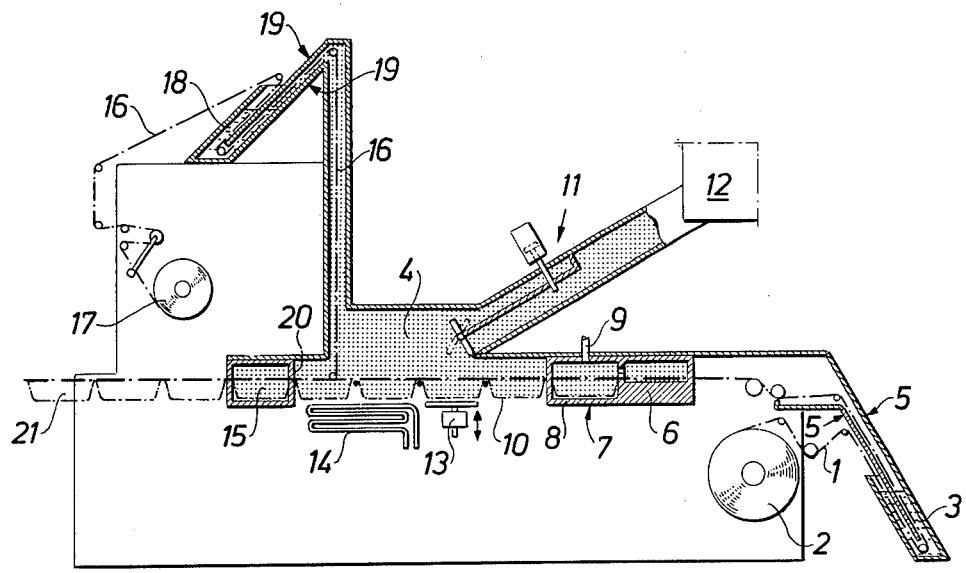
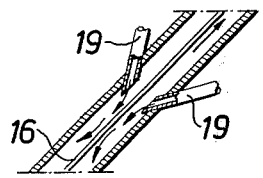
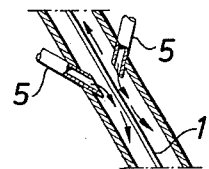
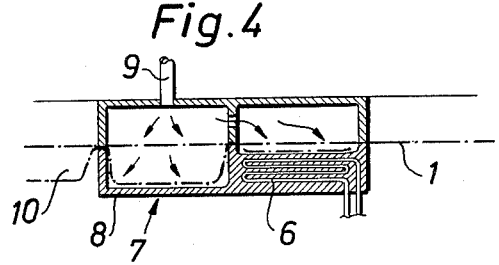

PROCESS FOR PACKAGING GOODS IN A STEAM ATMOSPHERE

The present invention relates to a method for packaging a food product in a steam atmosphere in a package of which at least one part is cupped. The method is characterized in that steam is used for this cupping. As a result of this, the steam may be utilized for several purposes. On one hand the oxygen of the air is displaced, whereby the durability of the product is as a rule prolonged, on the other hand both the pressure of the steam and its heat contents are utilized for the cupping.

Preferably, the steam atmosphere is caused to fill a closed space completely in a conventional packaging machine under such a pressure above atmospheric that the said space is maintained essentially free from oxygen.

Specifically, the method according to the invention is suitable for packages formed from an originally plane lower web of thermodeformable material which is cupped so as to form cup-like packaging units which are then filled and finally sealed with the aid of a plane upper web. In order to provide a sterile or at least aseptic package during this operation both the lower web and the upper web are each introduced into the said closed packaging space via a liquid lock containing a bactericide, e.g. hydrogen peroxide. The liquid applied to the material webs can be removed by means of steam which is blown under pressure against the webs.

Steam may also be used in order to preheat the material to be cupped. The said preheating takes place in such a way that the material is first preheated from above with the aid of steam atmosphere and from below with the aid of preferably electric elements and is then moved directly to a cupping station in which it is cupped with the aid of steam under possible additional heating.

The product to be packed, e.g. peeled and completely or partly boiled potatoes or other roots, may be introduced into the packaging space in an essentially sterile state directly from a production machine via a dosage means by keeping the whole space between the production machine and the packaging space in a steam atmosphere essentially without oxygen.

The invention also comprises an installation for performing the method described above. The said installation is characterized in that a closed space has been formed in a conventional packaging machine for cupping a lower web and sealing by means of an upper web by isolating the forming, filling, and sealing portions of the machine from the surrounding atmosphere and providing them with a steam atmosphere, at the same time as means have been provided in order to utilize steam as a forming agent at the cupping operation.

The method and the installation according to the invention can be used for packaging many different products. In the first place it has been designed for packaging peeled potatoes completely or partly boiled. The appended drawing shows by way of example a diagrammatic view of an installation suitable for such a purpose. The installation is based on a machine of the conventional kind. For this reason, only those details are shown which are of importance for understanding the present invention.

FIG. 1 is a diagrammatic view of a section through the machine, while

FIGS. 2 to 4 show different details therein.

In the machine shown a lower web 1 is taken from a store 2 of materials and is moved via a liquid lock 3 into a closed packaging space designated throughout by 4 and given a slight shadowing in the drawing. The liquid from the liquid lock 3 is removed, as is best shown in FIG. 3, from the web 1 with the aid of steam nozzles 5. These steam nozzles 5 serve as two doctoring means which can be said to scrape off the liquid from the material web 1. At the same time the steam sprayed onto the web causes preheating of the lower web 1. Additional preheating of the lower web 1 is achieved by maintaining the whole packaging space 4 in a steam atmosphere under a pressure above atmospheric. In addition, the material web is preheated by means of elements 6 provided immediately before a forming station 7. These elements 6 may either be electrically heated or steam heated. In the cupping station a mould 8 is pressed up against the web in a conventional manner. Instead of being formed with the aid of compressed air, as is normal, the forming of the web takes place with the aid of steam which is supplied via the diagrammatically shown duct 9. As a result of this, the material is heated additionally and is caused to adjust carefully to the shape of the mould 8. As a result of a suitable design of the cupping station 7 and the top of the preheating element 6 it is possible as shown in FIG. 4, to bring about that the material web is pressed against the element 6 by the steam which simultaneously forms the web in the subsequent station 7. The cup-like packaging units obtained, which are designated 10, are then moved in below a diagrammatically shown dosage means 11. Via the said dosage means 11 the product can be moved from a production machine 12 down into the packaging units 10. In order that the product may be well packed in the latter they are exposed to vibration by means of a diagrammatically shown device 13. Immediately afterwards they are exposed to heating with the aid of an element 14. This heating operation serves to ensure that no condensate or as little condensate as possible will collect at the bottom of the packages. Finally, the filled and essentially dry packages are moved to a sealing station 15. To this station there is moved the material forming the top web 16 from a storage roll 17 via a liquid bath or a liquid lock 18. This web 2 is dried by means of steam doctors designated 19. The top web is sealed to the top side of the filled lower packages 10 in a conventional manner with the aid of a heating jaw 20. Thereupon, the finished, filled and sealed packages 21 are dispensed from the machine via a simple lock means not shown in detail. Due to the fact that a certain pressure above atmospheric is being maintained in the steam atmosphere no major demands are placed on the said lock means. Finally, the packages obtained are cooled, whereby they obtain the appearance of being vacuum treated.

The invention is not of course restricted exclusively to the embodiment described above but may be varied within the scope of the following claims. The invention may for instance also be applied to other kinds of food than potatoes and roots, e.g. to meat courses or other prefabricated food.

We claim:

1. In a method of forming containers from a web of thermodeformable material and for filling and sealing said containers under aseptic conditions in an apparatus having a chamber in which forming, filling and sealing steps are carried out, the improvement comprising introducing steam at a super-atmospheric pressure into the chamber and onto a surface of the web for softening the web and for molding said web into a cup-shaped mold, said steam passing throughout said chamber to displace substantially all of the air therein and to maintain aseptic conditions during the forming, filling and sealing of the containers.

2. A method as claimed in claim 1 and further comprising passing the web into said chamber, passing a second web into the chamber for sealing said containers, treating each web with a bactericidal agent before the webs are introduced into the chamber.

3. A method as claimed in claim 2 and further comprising blowing said webs with steam under super-atmospheric pressure after treating said webs with bactericidal agent to remove the bactericidal agent therefrom.

4. A method as claimed in claim 1 wherein a portion of the steam introduced onto the web is directed onto the surface of the web prior to the molding step to preheat the web.

5. A method as claimed in claim 4 and further comprising applying additional heat to the opposed surface of the web while preheating the web.

6. A method as claimed in claim 1 and further comprising metering the contents to be filled into the containers said metering step being carried out under aseptic conditions within the chamber.

7. A method as claimed in claim 1 and further comprising vibrating the filled container prior to sealing said container to render the contents more compact.

8. A method as claimed in claim 1 and further comprising applying heat to the filled package after filling and before sealing to remove at least part of possible condensate within the filled container.

9. A method as claimed in claim 1 and further comprising the step of passing the sealed containers out from the chamber and cooling said containers.

10. In an apparatus for forming, filling and sealing, under aseptic conditions, packaging containers from a web of a thermodeformable material, which apparatus includes an enclosed chamber and sequential means for forming, filling and sealing said containers within said chamber, said forming means including a mold, the improvement comprising means for supplying steam at super-atmospheric pressure into said chamber and onto the surface of said web at a point adjacent said forming means to heat the web of themodeformable material to its softening temperature and to form in said mold a container of said thermodeformable material, said steam displacing substantially all of the air within said chamber to maintain aseptic conditions therein during filling and sealing of the containers.

11. In an apparatus as claimed in claim 10 the further improvement comprising means for passing the web into the chamber, means for passing a second web into the chamber for sealing said containers, and means for treating each web with a bactericidal agent before the webs are introduced into said chamber.

12. In an apparatus as claimed in claim 10 the further improvement comprising means for metering the contents to be filled into the containers, said metering means being disposed under aseptic conditions within said chamber.

* * * * *